(12) United States Patent
Hilsabeck et al.

(10) Patent No.: US 8,376,386 B2
(45) Date of Patent: Feb. 19, 2013

(54) TOWED VEHICLE HAVING TWO TOWING MODES

(75) Inventors: Douglas A. Hilsabeck, Lacombe (CA); Peter Verhoog, Ponoka (CA)

(73) Assignee: Renn Mill Center Inc., Lacombe, Alberta (CA)

( * ) Notice: Subject to any disclaimer, the term of this patent is extended or adjusted under 35 U.S.C. 154(b) by 132 days.

(21) Appl. No.: 12/939,217

(22) Filed: Nov. 4, 2010

(65) Prior Publication Data

US 2011/0272917 A1    Nov. 10, 2011

Related U.S. Application Data

(60) Provisional application No. 61/257,973, filed on Nov. 4, 2009.

(51) Int. Cl.
*B60D 1/42* (2006.01)

(52) U.S. Cl. ............... 280/456.1; 280/406.1; 280/415.1

(58) Field of Classification Search ............... 280/456.1, 280/406.1, 414.5, 415.1, 491.1, 491.3
See application file for complete search history.

(56) References Cited

U.S. PATENT DOCUMENTS

| | | | | |
|---|---|---|---|---|
| 2,806,707 A * | 9/1957 | Christie | ............... | 280/29 |
| 2,833,105 A * | 5/1958 | Naery | ............... | 56/228 |
| 3,142,144 A * | 7/1964 | Martin | ............... | 56/228 |
| 3,536,339 A * | 10/1970 | Fichtenberg | ............... | 280/414.5 |
| 3,574,388 A * | 4/1971 | Stone | ............... | 296/168 |
| 3,649,048 A * | 3/1972 | Garnett | ............... | 280/477 |
| 4,369,854 A | 1/1983 | Butterworth | | |
| 4,428,435 A * | 1/1984 | Hubbard et al. | ............... | 172/328 |
| 4,569,296 A * | 2/1986 | Miller et al. | ............... | 111/123 |
| 4,596,290 A | 6/1986 | Bedney | | |
| 4,986,064 A * | 1/1991 | Ermacora | ............... | 56/228 |
| 5,357,737 A * | 10/1994 | Ermacora et al. | ............... | 56/16.4 R |
| 5,419,102 A * | 5/1995 | Inman et al. | ............... | 53/567 |
| 5,564,538 A | 10/1996 | Sadow | | |
| 5,607,176 A * | 3/1997 | Leib et al. | ............... | 280/656 |
| 5,647,440 A | 7/1997 | Barry et al. | | |
| 5,685,554 A * | 11/1997 | Poxleitner | ............... | 280/491.2 |
| 5,921,325 A | 7/1999 | Meek et al. | | |
| 6,332,626 B1 * | 12/2001 | Morrill | ............... | 280/491.3 |
| 6,857,650 B2 * | 2/2005 | Ward | ............... | 280/491.3 |
| 7,063,497 B2 * | 6/2006 | Mast et al. | ............... | 414/572 |
| 7,090,066 B2 * | 8/2006 | Kirsch | ............... | 198/302 |
| 7,198,449 B2 * | 4/2007 | Dillon | ............... | 414/502 |
| 7,219,903 B2 | 5/2007 | Grooters et al. | | |
| 7,338,064 B1 * | 3/2008 | Williams | ............... | 280/491.3 |
| 7,618,227 B2 * | 11/2009 | Smith | ............... | 414/484 |
| 8,118,151 B1 * | 2/2012 | Jesse | ............... | 198/315 |
| 2007/0018429 A1 * | 1/2007 | Randall | ............... | 280/491.1 |
| 2010/0019469 A1 * | 1/2010 | Groves | ............... | 280/414.5 |

* cited by examiner

*Primary Examiner* — Anne Marie Boehler
*Assistant Examiner* — Maurice Williams
(74) *Attorney, Agent, or Firm* — Davis & Bujold, PLLC

(57) ABSTRACT

A towed vehicle having two towing modes has a first set of wheels positioned on a first axis defining an operative position supporting a frame. A second set of wheels is positioned on a second axis, perpendicular to the first axis. The second set of wheels has a lowered operative position and a raised inoperative position. When the second set of wheels is in the lowered operative position, they lift the first set of wheels off the ground to an inoperative position. A first towing connection is provided for connecting the frame to a tow vehicle when the first set of wheels are in the operative position. A second towing connection is provided, perpendicular to the first towing connection, for connecting the frame to the tow vehicle when the second set of wheels are in the operative position.

8 Claims, 17 Drawing Sheets

TOWED VEHICLE HAVING TWO TOWING MODES

FIELD

There is described a vehicle that is intended to be towed. The vehicle has one mode for off road use and another mode for highway use.

BACKGROUND

There are restrictions imposed by law as to the width of vehicles that are permitted to travel on highways. This restriction affects many industry sectors, one of which is the agricultural industry. There are many types of agricultural machinery that exceed legal width restrictions for travel on highways. One solution to this problem has been to build agricultural machinery with wings that fold. However, it is not always practical to have the agricultural machinery fold.

SUMMARY

There is provided a towed vehicle having two towing modes. The towed vehicle has a frame, a first set of wheels and a second set of wheels. The first set of wheels is positioned on a first axis and has an operative position supporting the frame. The second set of wheels is positioned on a second axis, which is perpendicular to the first axis. The second set of wheels has a lowered operative position and a raised inoperative position. When the second set of wheels is in the lowered operative position, they support the frame and lift the first set of wheels off the ground to an inoperative position. A first towing connection is provided for connecting the frame to a tow vehicle when the first set of wheels are in the operative position and the second set of wheels are in the inoperative position. A second towing connection is provided, perpendicular to the first towing connection, for connecting the frame to the tow vehicle when the second set of wheels are in the operative position and the first set of wheels are in the inoperative position.

There will hereinafter be described how these teachings can be usefully employed in agricultural machinery. The agricultural machinery selected for this purpose is a grain bagger. It will appreciated that the teachings are applicable to other agricultural machinery and to applications outside of the agricultural industry.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 13:
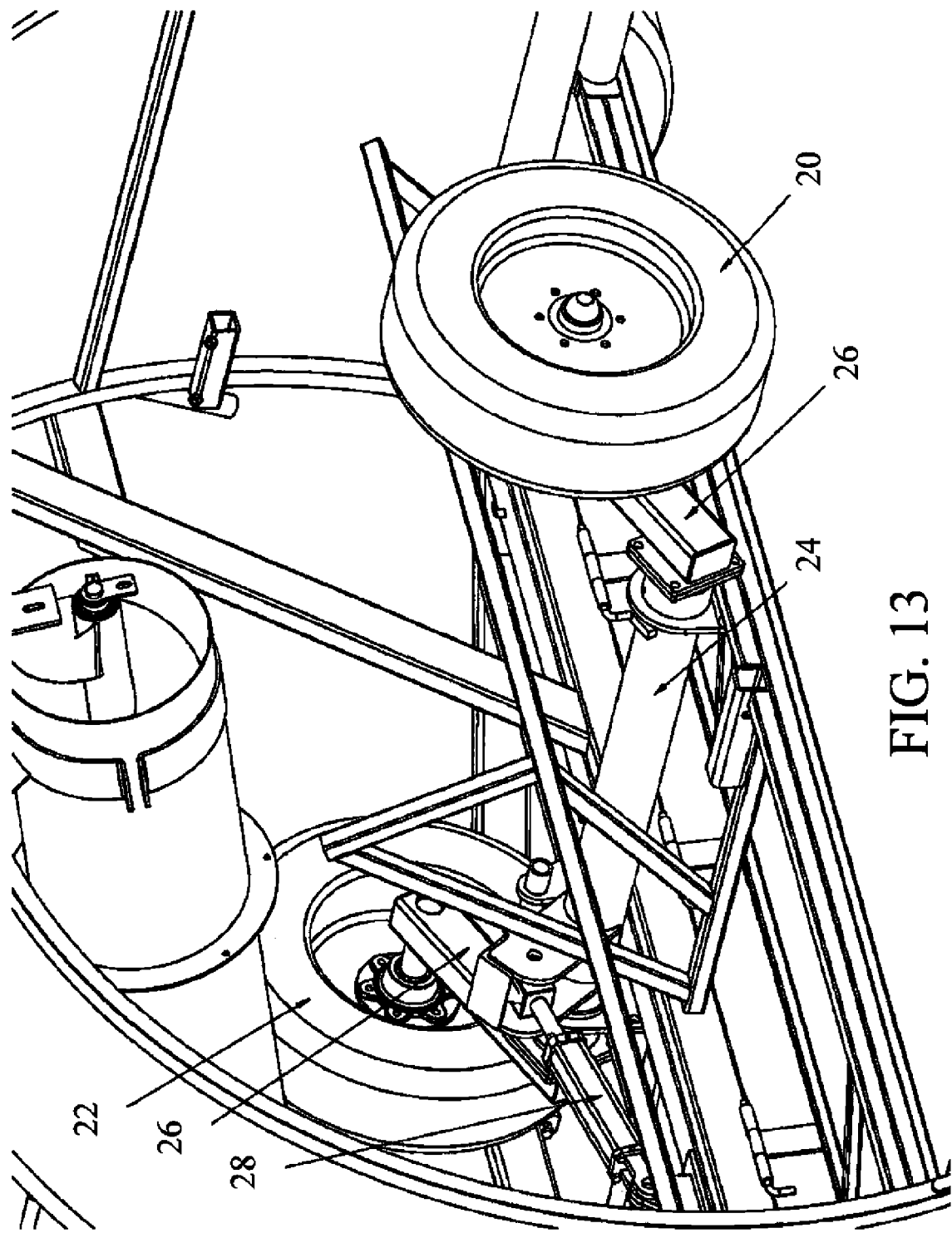
FIG. 13 is a detailed cutaway perspective view of the grain bagger illustrated in FIG. 10, showing an actuator for the second set of wheels in a retracted position.
Figure 14:
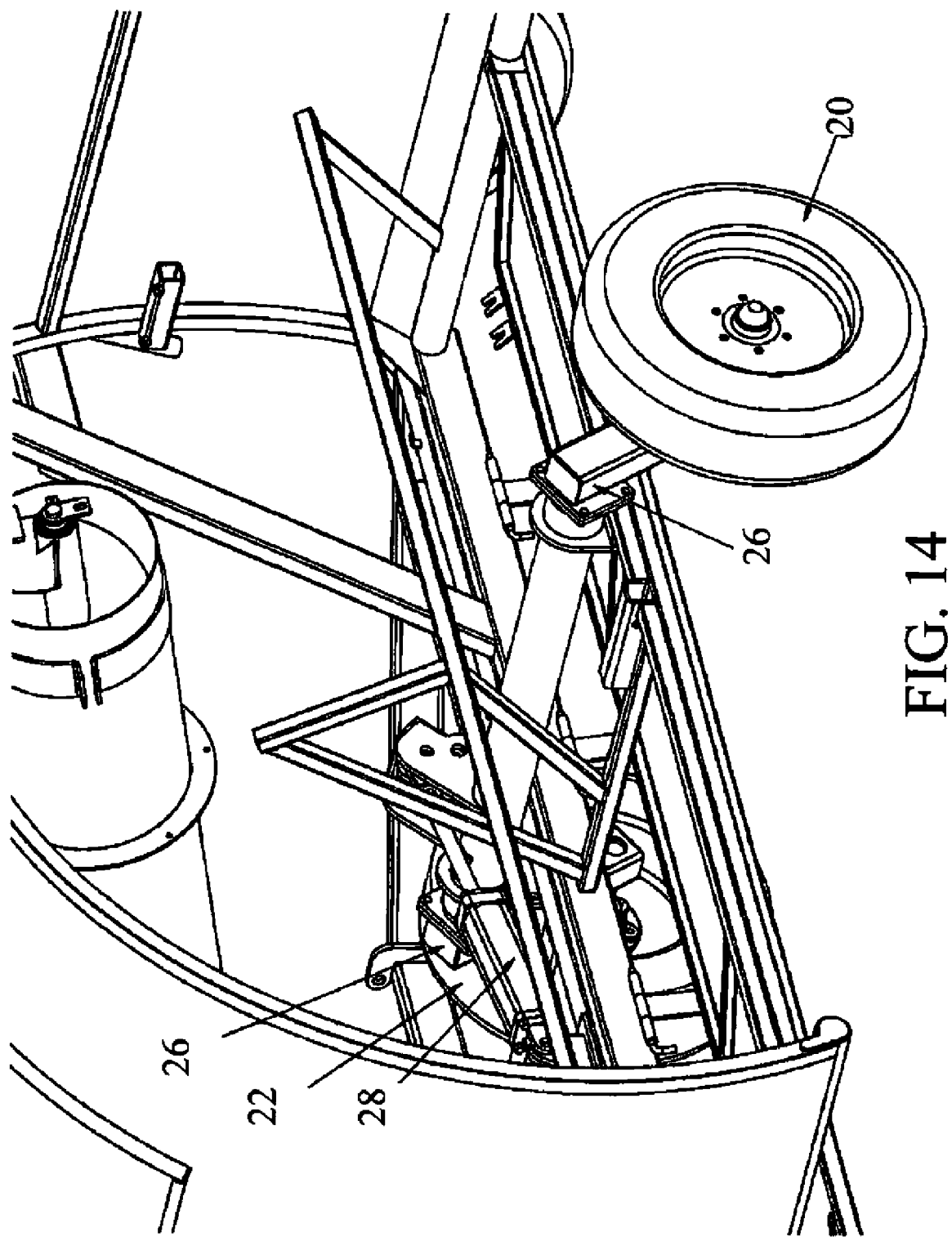
FIG. 14 is a detailed cutaway perspective view of the grain bagger illustrated in FIG. 10, showing the actuator for the second set of wheels in an extended position.
Figure 15:
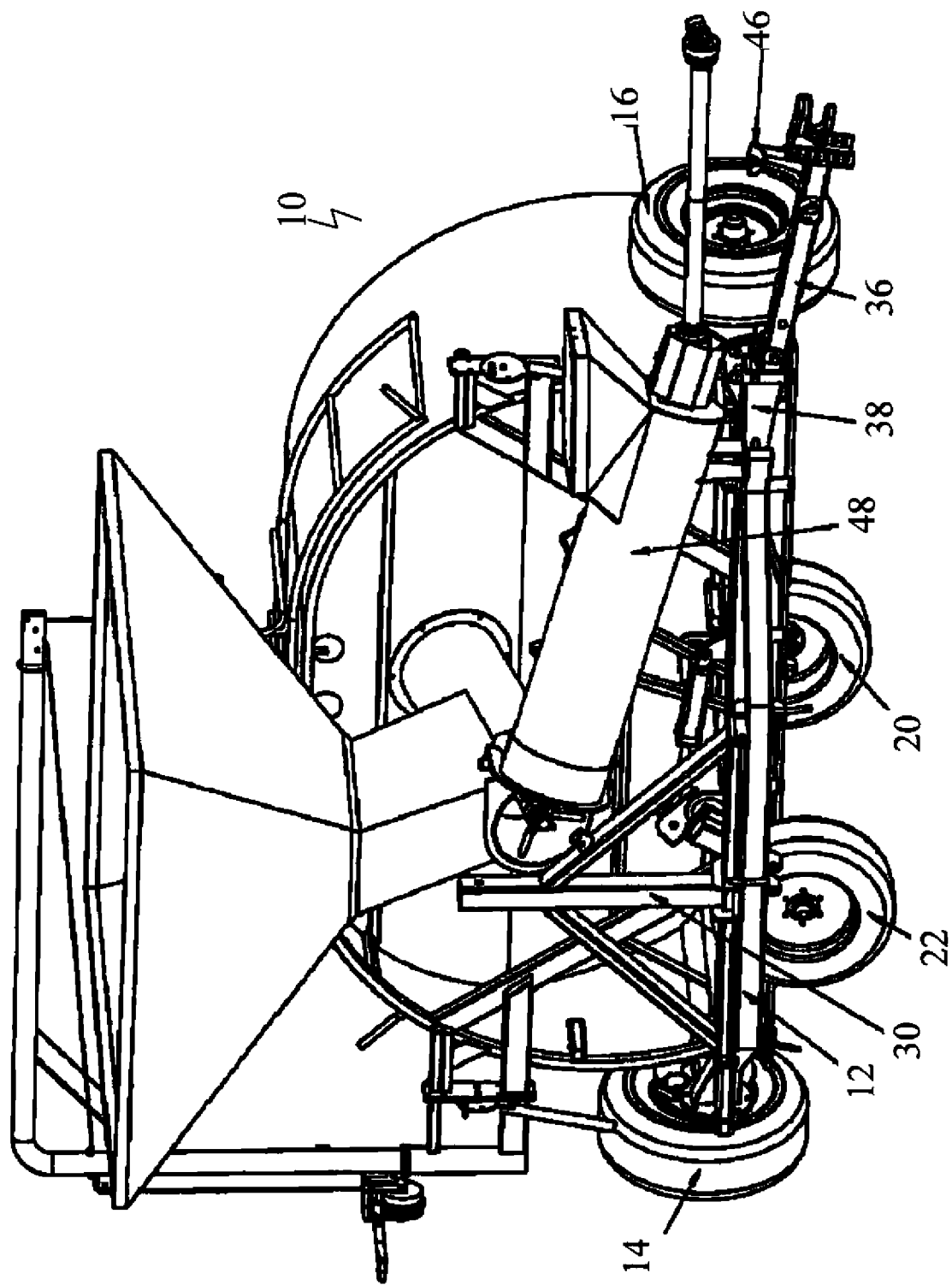
FIG. 15 is a perspective view of the grain bagger in the highway mode.
Figure 16:
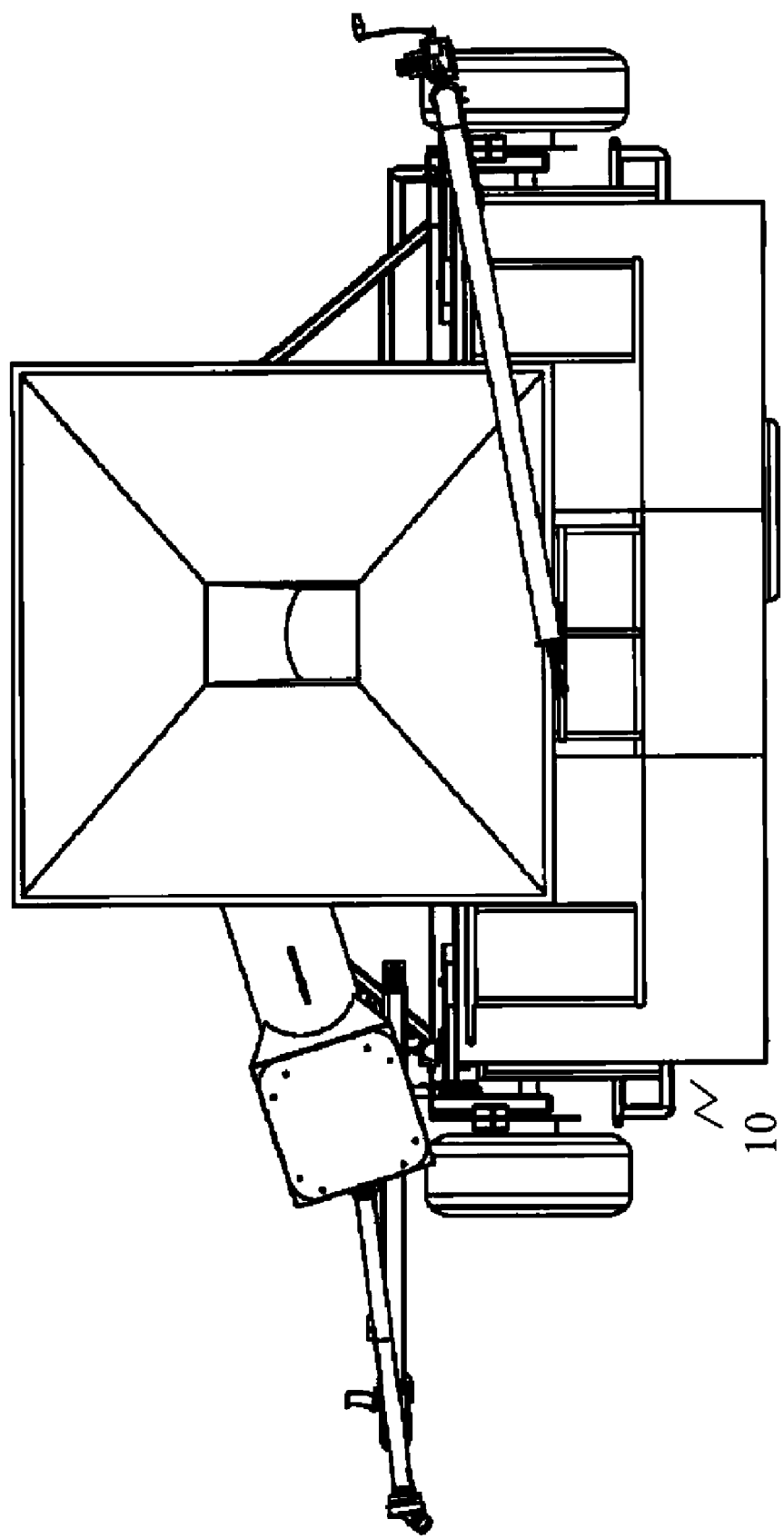
FIG. 16 is a top plan view of the grain bagger in the highway mode.
Figure 17:
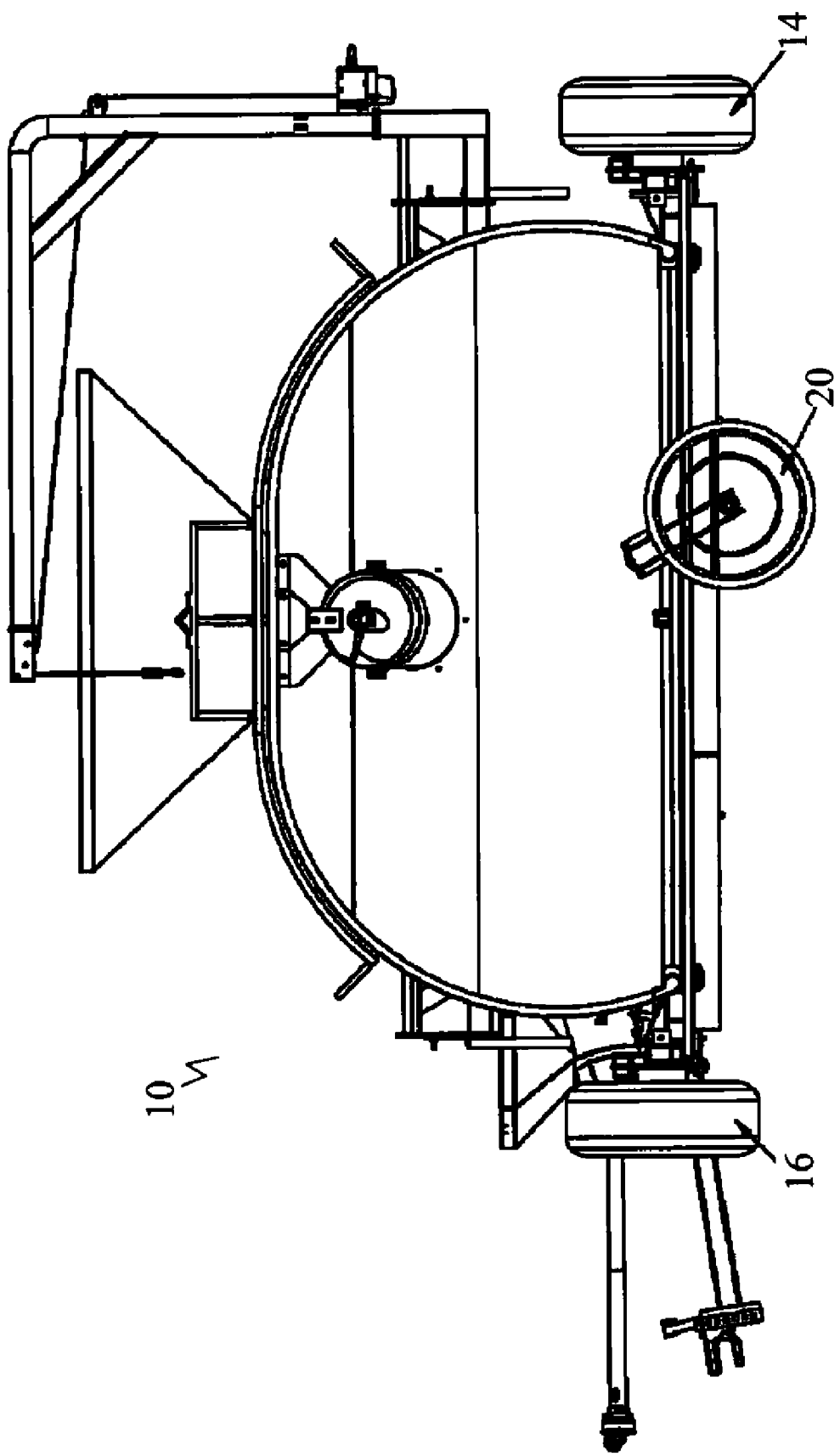
FIG. 17 is a rear elevation view of the grain bagger in the highway mode.

A grain bagger generally identified by reference numeral 10, will now be described with reference to FIGS. 1 through 17. Grain bagger 10 has been selected as to show how the teachings regarding a towed vehicle having two towing modes may be applied to agricultural machinery. Referring to FIGS. 1 through 4, grain bagger 10 has an off road mode, which is applicable when grain bagger 10 is being used in a farm setting. Referring to FIGS. 15 through 17, grain bagger 10 has a highway mode, which is applicable when grain bagger 10 is being towed on public highways between farm fields. Referring to FIG. 5 through FIG. 14, there is illustrated the step by step conversion of grain bagger 10 from the off road mode to the highway mode. The description which follows will not focus upon the operation of a grain bagger, the description which follows will focus upon the features which enable the illustrated grain bagger to be converted between the off road mode and the highway mode.

Figure 1:
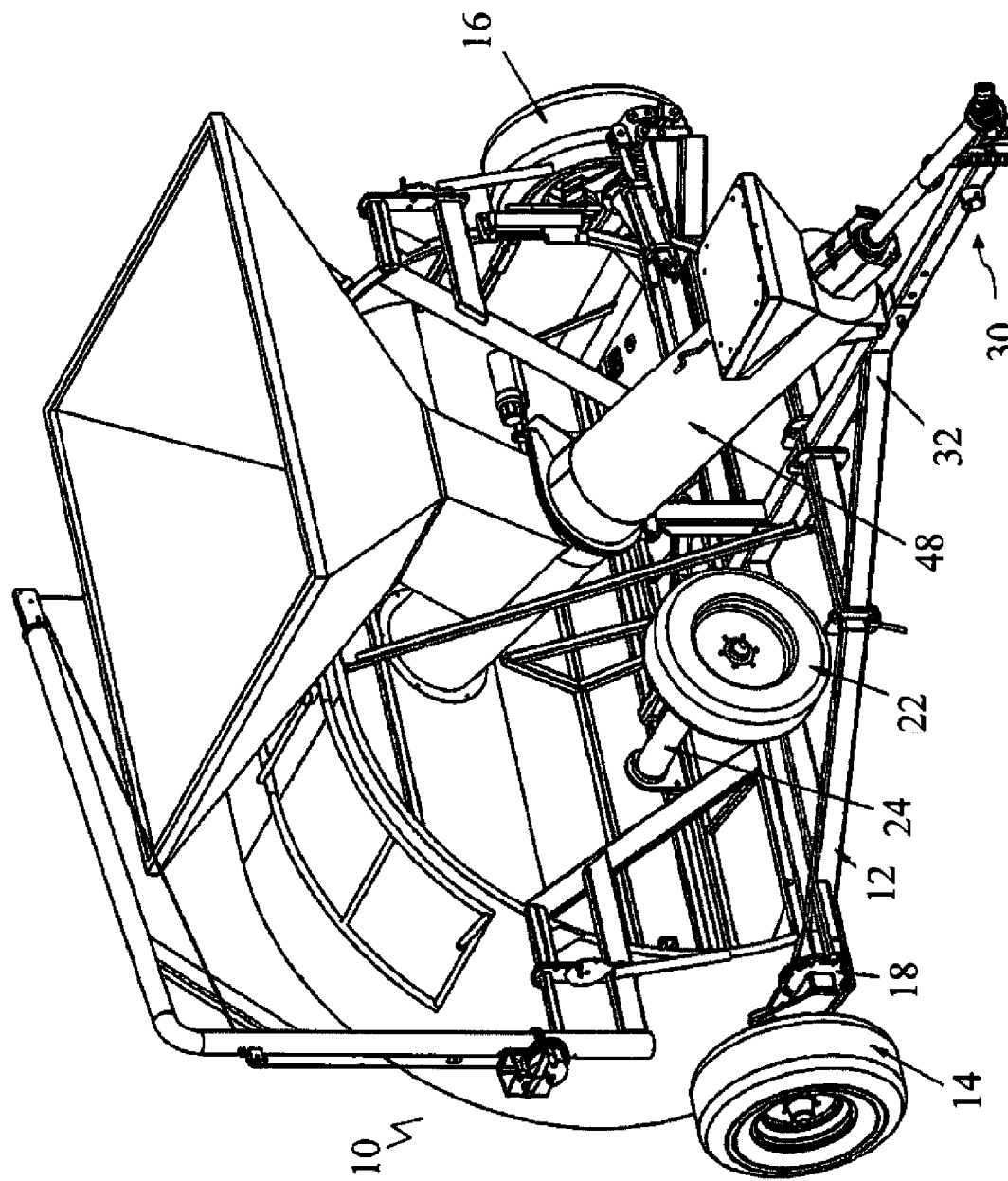
FIG. 1 is a perspective view of a grain bagger in an off road mode.
Figure 4:
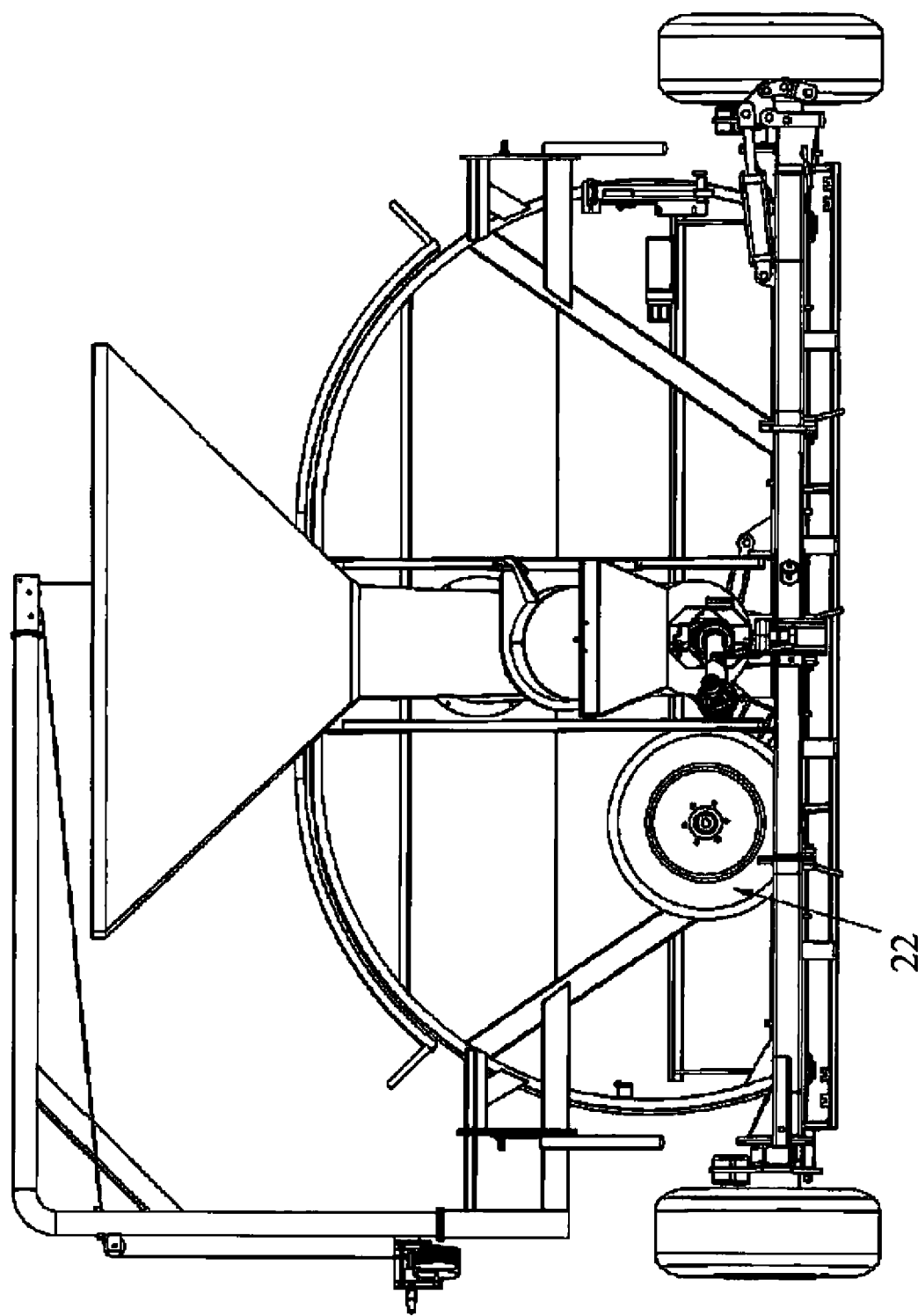
FIG. 4 is a front elevation view, in section, of the grain bagger in the off road mode.

Structure and Relationship of Parts:

Referring to FIG. 1, grain bagger 10 has a frame 12 and a first set of wheels 14 and 16 positioned on a first axis 18. First set of wheels 14 and 16 have an operative position supporting frame 12 when grain bagger 10 is in the off road mode. Referring to FIG. 13, grain bagger 10 also has a second set of wheels 20 and 22 positioned on a second axis 24. Referring to FIG. 1, second axis 24 is perpendicular to first axis 18. Referring to FIGS. 14, 15 and 17, second set of wheels 20 and 22 have a lowered operative position. Referring to FIGS. 1 and 4, second set of wheels 20 and 22 also have a raised inoperative position. Referring to FIGS. 15 and 17, when second set of wheels 20 and 22 are in the lowered operative position, they support frame 12 when grain bagger 10 is in the highway mode and lift first set of wheels 14 and 16 off the ground to an inoperative position. Referring to FIGS. 13 and 14, second set of wheels 20 and 22 are mounted on a drop axle 26 and moved between the operative position and the inoperative position by using a hydraulic actuator 28 to rotate drop axle 26.

Figure 6:
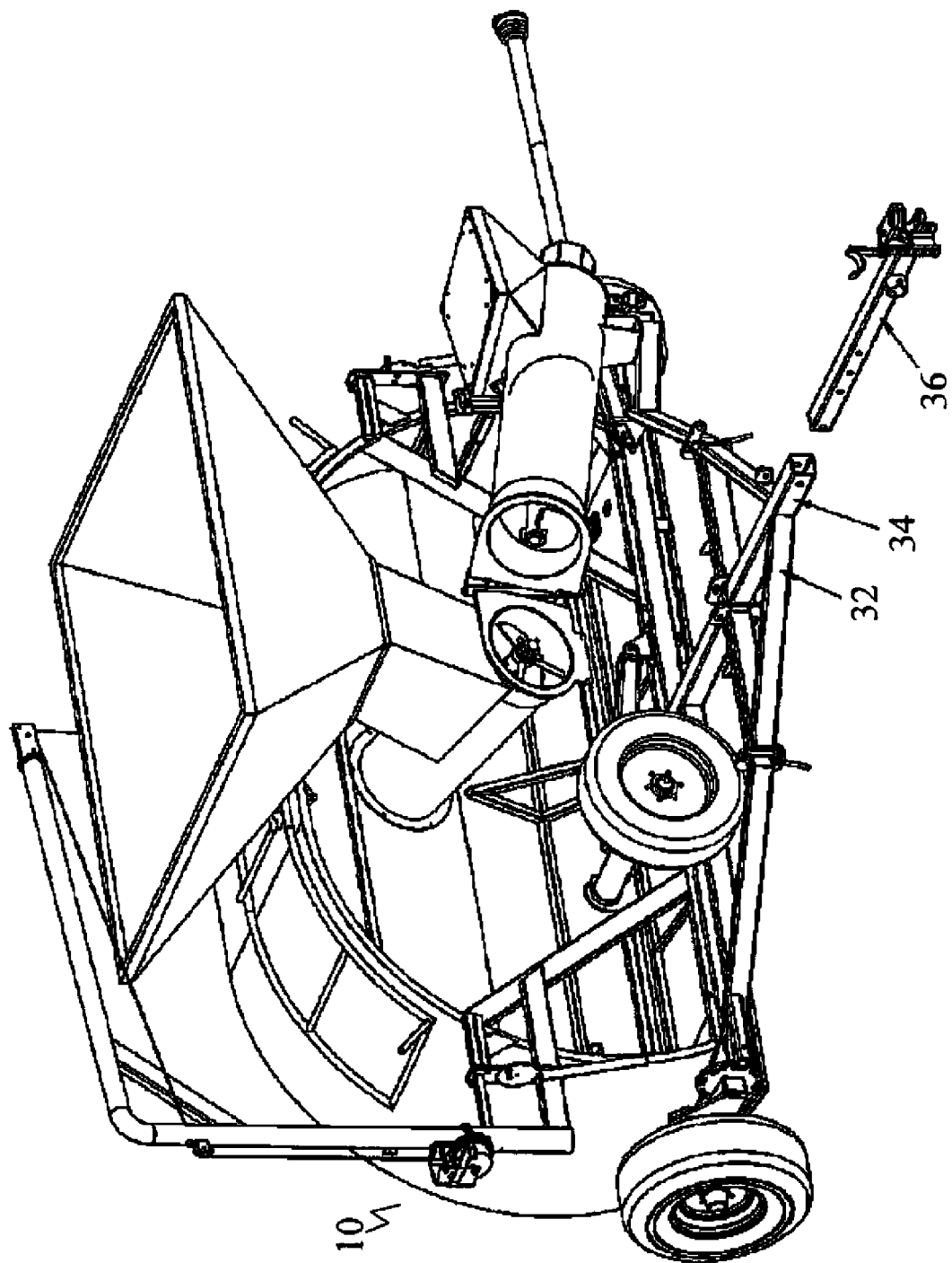
FIG. 6 is a perspective view of the grain bagger illustrated in FIG. 5 with a hitch bar detached in preparation for conversion from the off road mode to the highway mode
Figure 7:
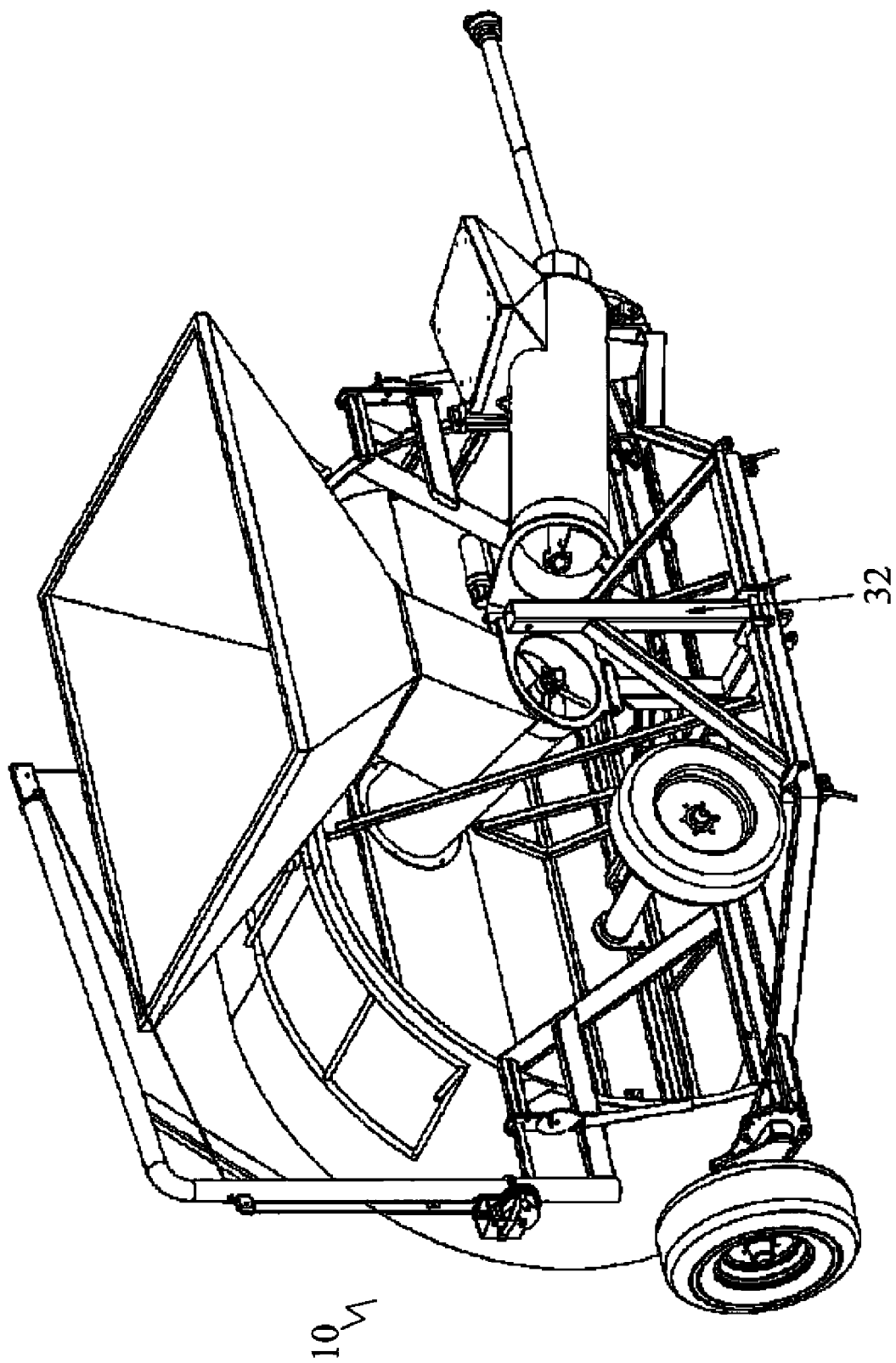
FIG. 7 is a perspective view of the grain bagger illustrated in FIG. 6 with a first hitch support pivoted from an operative towing position to an inoperative position in preparation for conversion from the off road mode to the highway mode.
Figure 8:
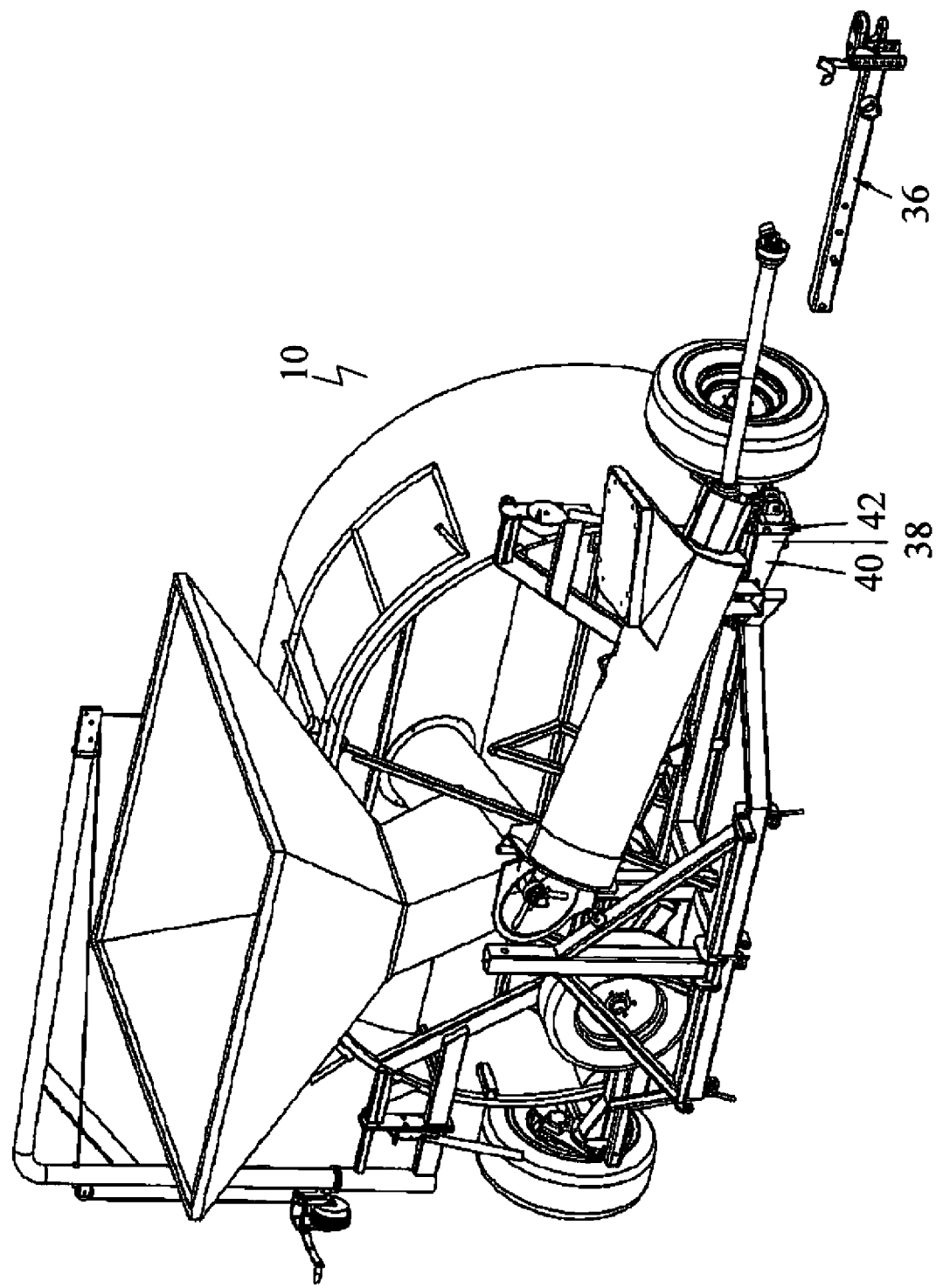
FIG. 8 is a perspective view of the grain bagger illustrated in FIG. 7 with the hitch bar positioned in preparation for insertion into a second hitch support.
Figure 9:
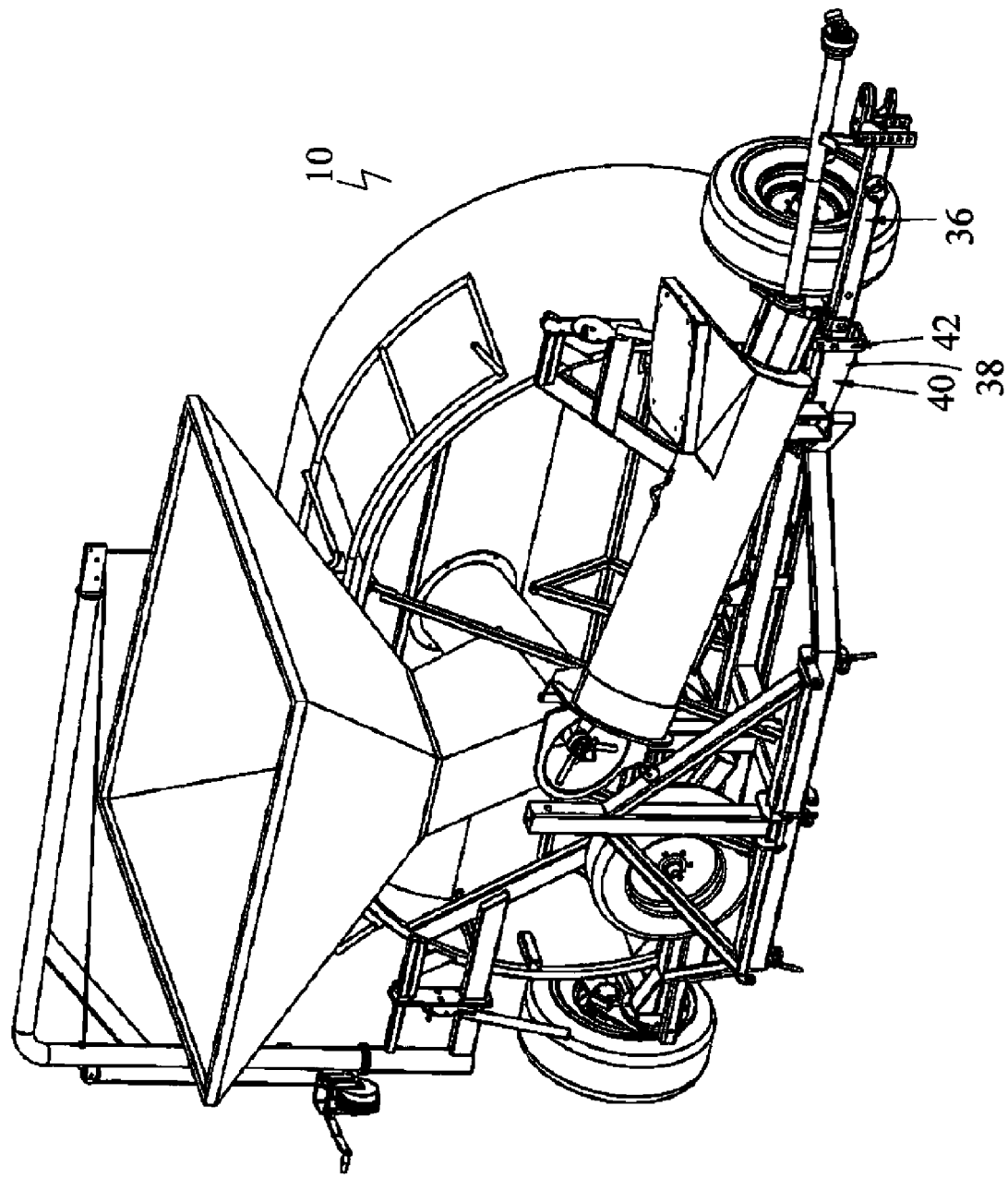
FIG. 9 is a perspective view of the grain bagger illustrated in FIG. 8 with the hitch bar positioned in the second hitch support.
Figure 11:
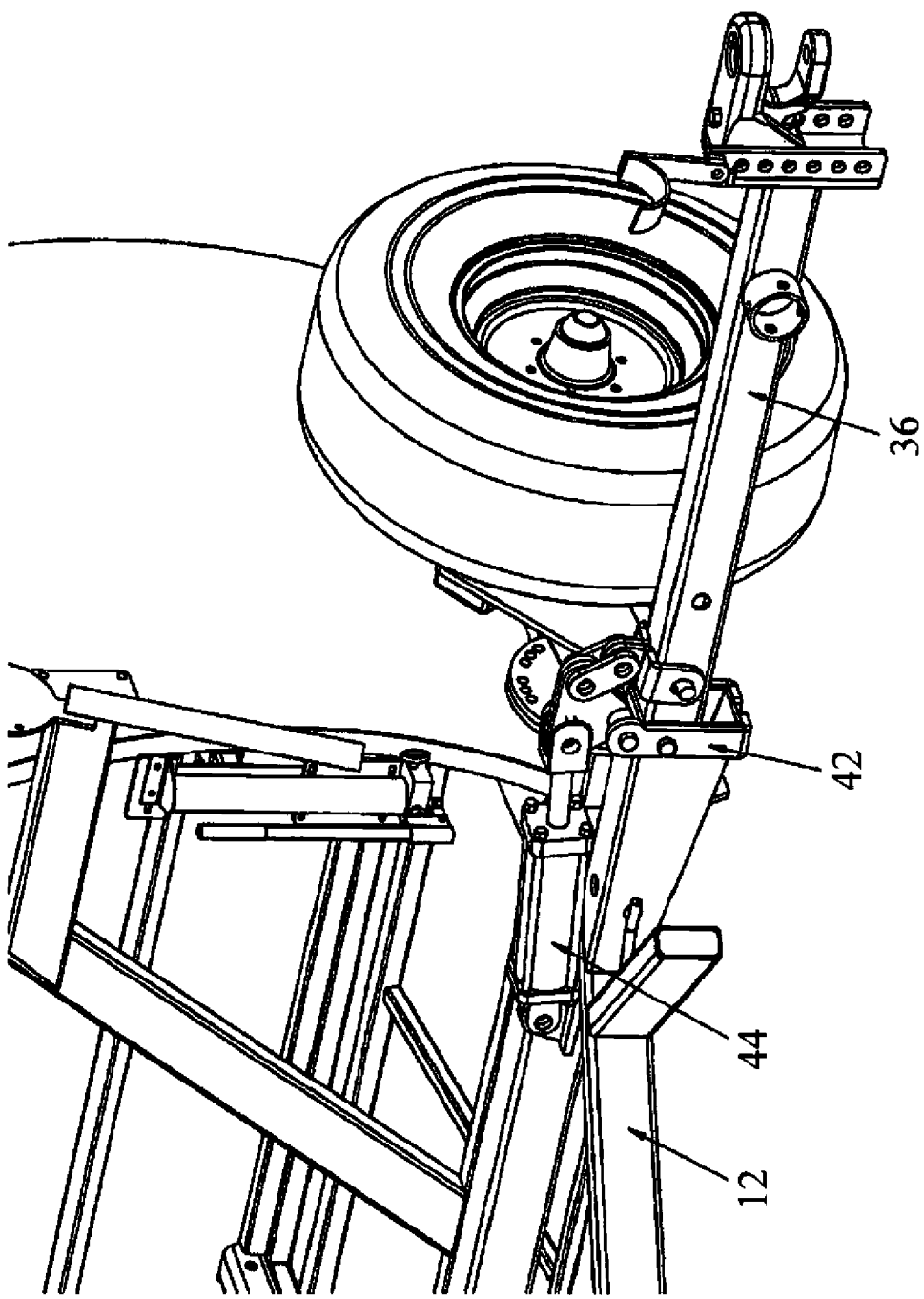
FIG. 11 is a detailed cutaway perspective view of the grain bagger illustrated in FIG. 10, showing an actuator for the second hitch support in a retracted position.
Figure 12:
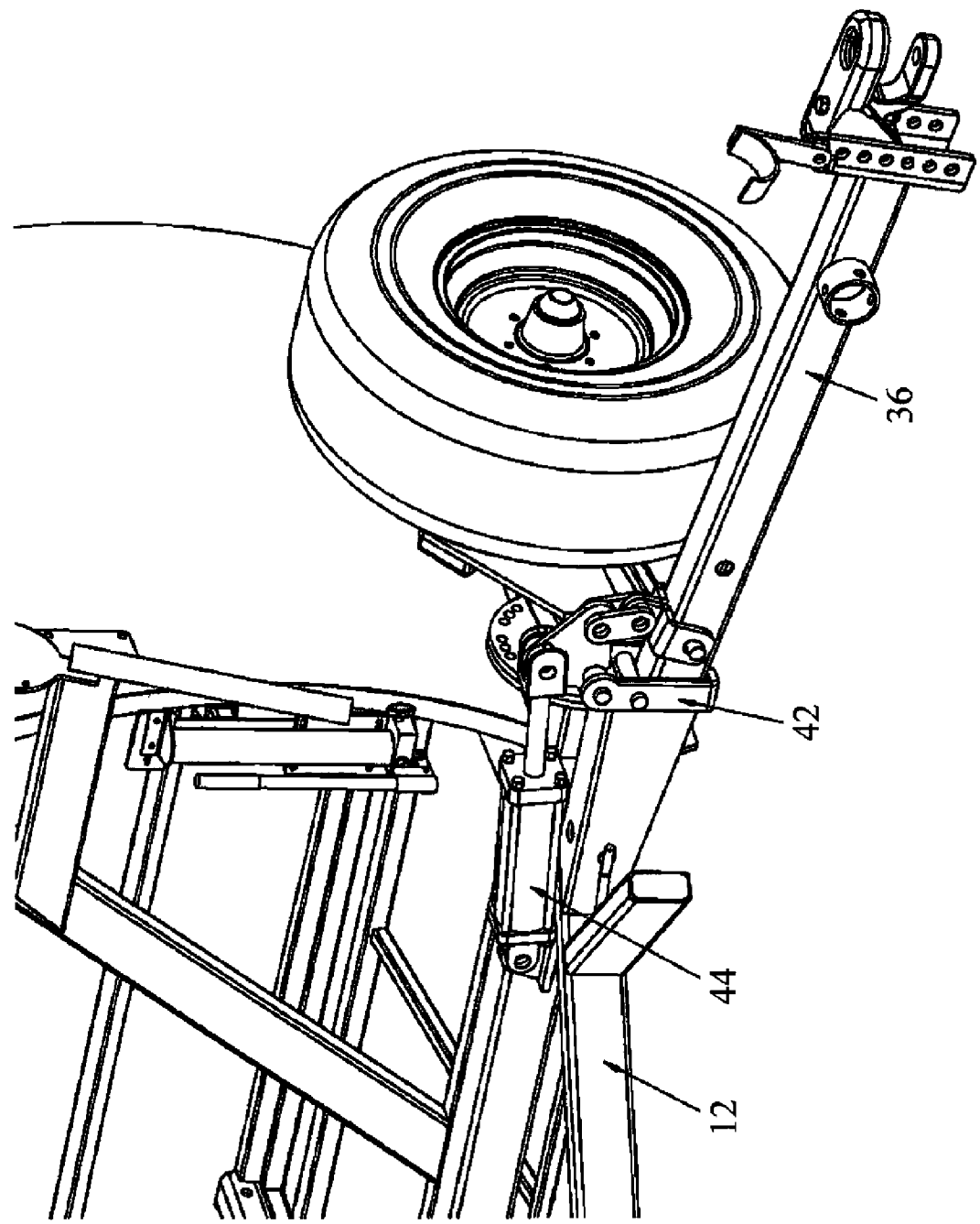
FIG. 12 is a detailed cutaway perspective view of the grain bagger illustrated in FIG. 10, showing the actuator for the second hitch support in an extended position.

Referring to FIG. 1, a first towing connection, generally identified by reference numeral 30, is provided for connecting frame 12 to a tow vehicle (not shown) when first set of wheels 14 and 16 are in the operative position and second set of wheels 20 and 22 (only wheel 22 shown in this view) are in the inoperative position. First towing connection 30 includes a first hitch support 32. Referring to FIG. 6, first hitch support 32 has a first receiver 34 in which is removably received a hitch bar 36. Referring to FIG. 1, first hitch support 32 is shown in an operative towing position. Referring to FIG. 7, first hitch support 32 is pivotally movable to a raised inoperative position, Referring to FIG. 15, a second towing connection, generally identified by reference numeral 38, is provided for connecting frame 12 to the tow vehicle (not shown) when second set of wheels 20 and 22 are in the operative position and first set of wheels 14 and 16 are in the inoperative position. Second towing connection 38 is perpendicular to first towing connection 30. Referring to FIGS. 8 and 9, second towing connection 38 includes a second hitch support 40 having a second receiver 42 in which is removably received hitch bar 36. Referring to FIGS. 11 and 12, a hydraulic actuator 44 is provided to alter the horizontal positioning of hitch bar 36 relative to second receiver 42.

Figure 5:
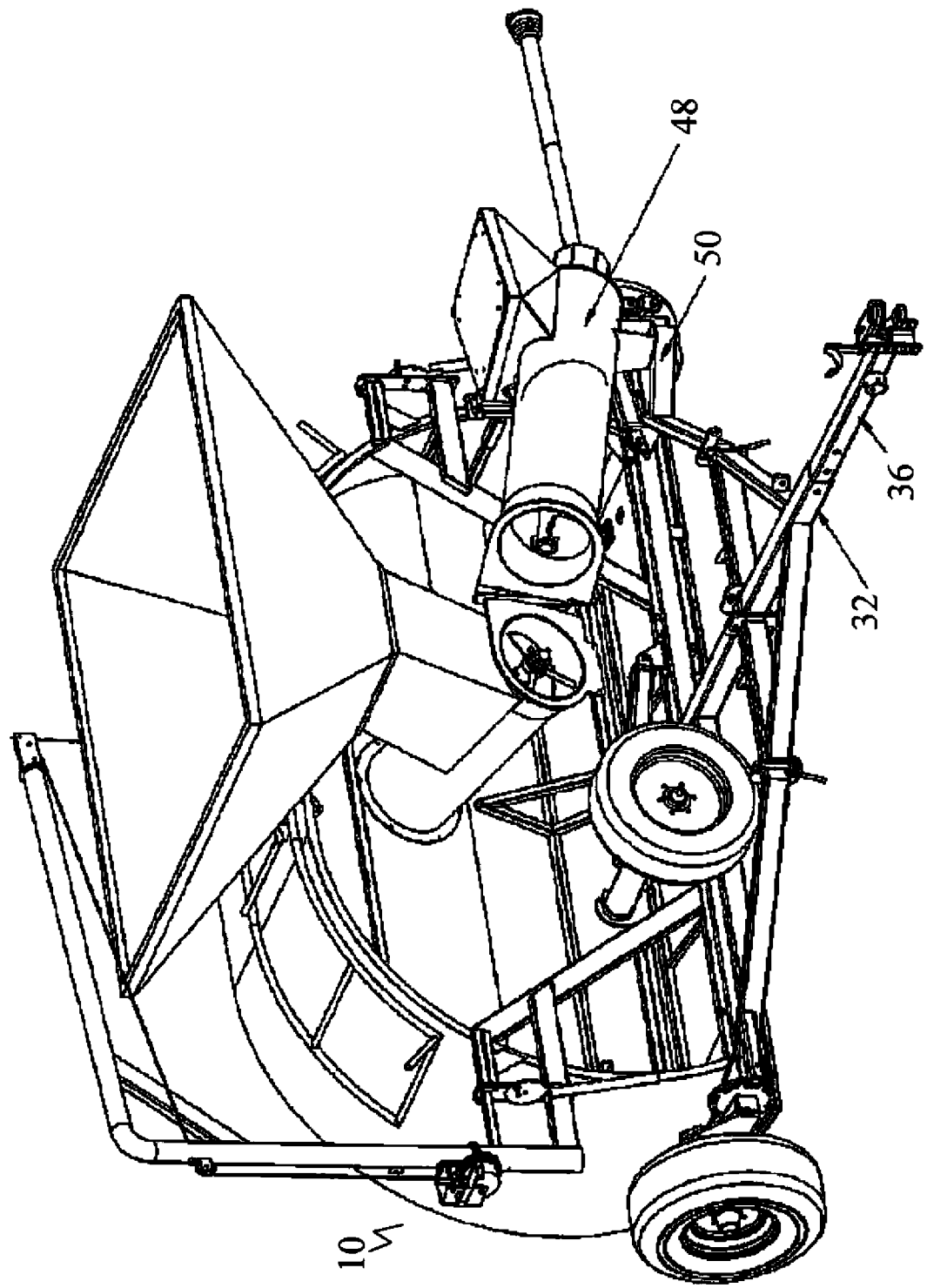
FIG. 5 is a perspective view of the grain bagger illustrated in FIG. 1, with a grain auger pivoted ninety degrees in preparation for conversion from the off road mode to a highway mode.
Figure 10:
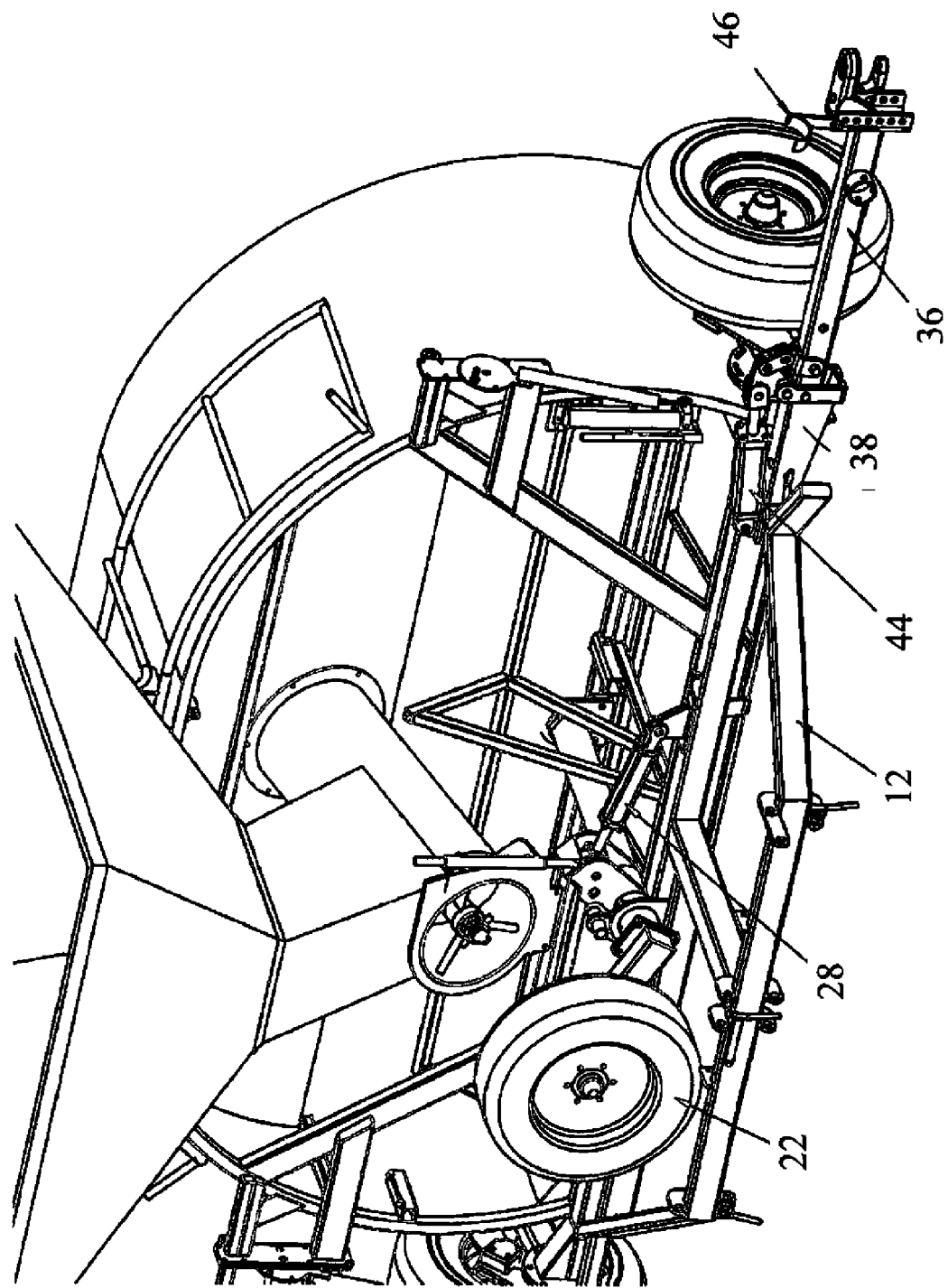
FIG. 10 is a detailed cutaway perspective view of the grain bagger illustrated in FIG. 9, showing actuator positioning.

Referring to FIGS. 5 and 10, hitch bar 36 has a cradle 46. Referring to FIG. 1, grain bagger 10 has an auger 48 rests in cradle 46 when hitch bar 36 forms part of first towing connection 30. Referring to FIG. 5, auger 48 pivots 90 degrees. Referring to FIG. 15, this enables auger 48 to also rest in cradle 46 when hitch bar 36 forms part of second towing connection 38.

Figure 2:
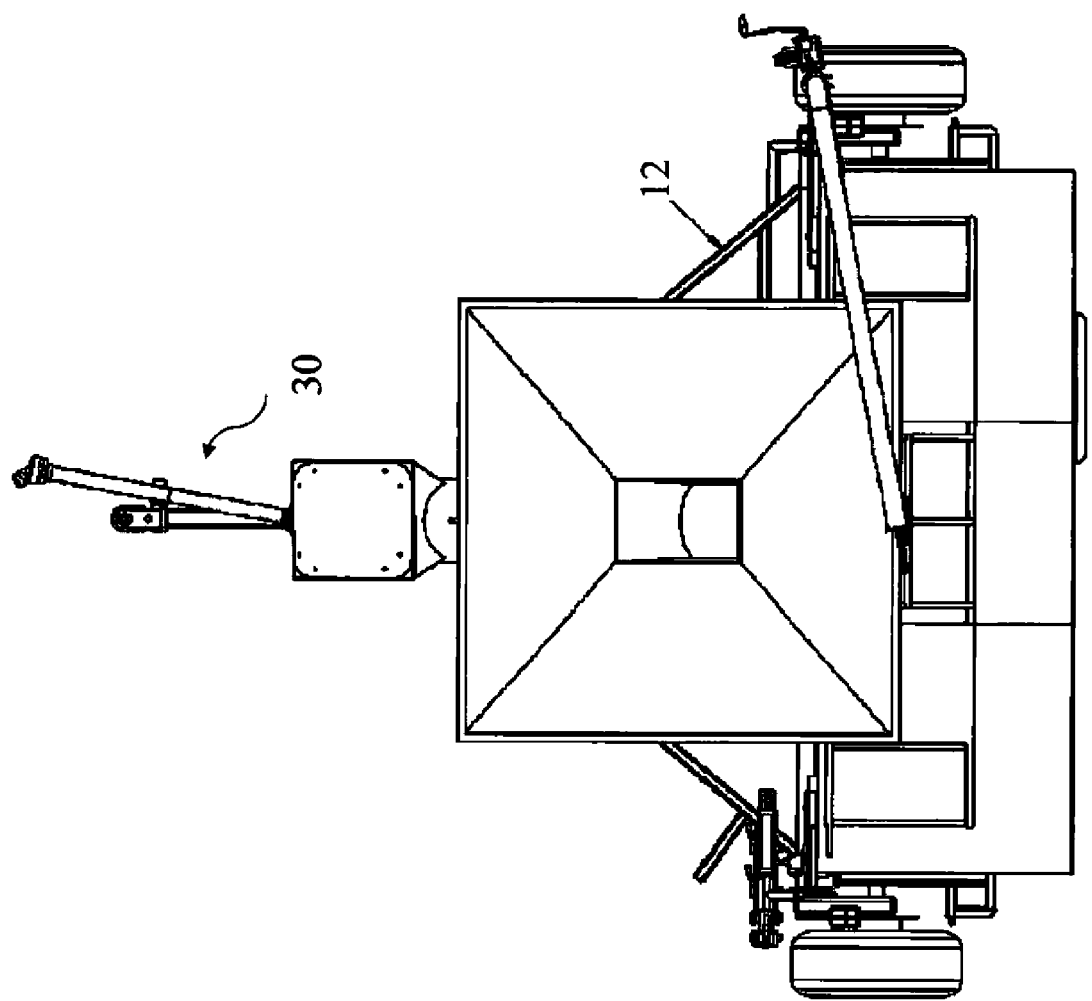
FIG. 2 is a top plan view of the grain bagger in the off road mode.
Figure 3:
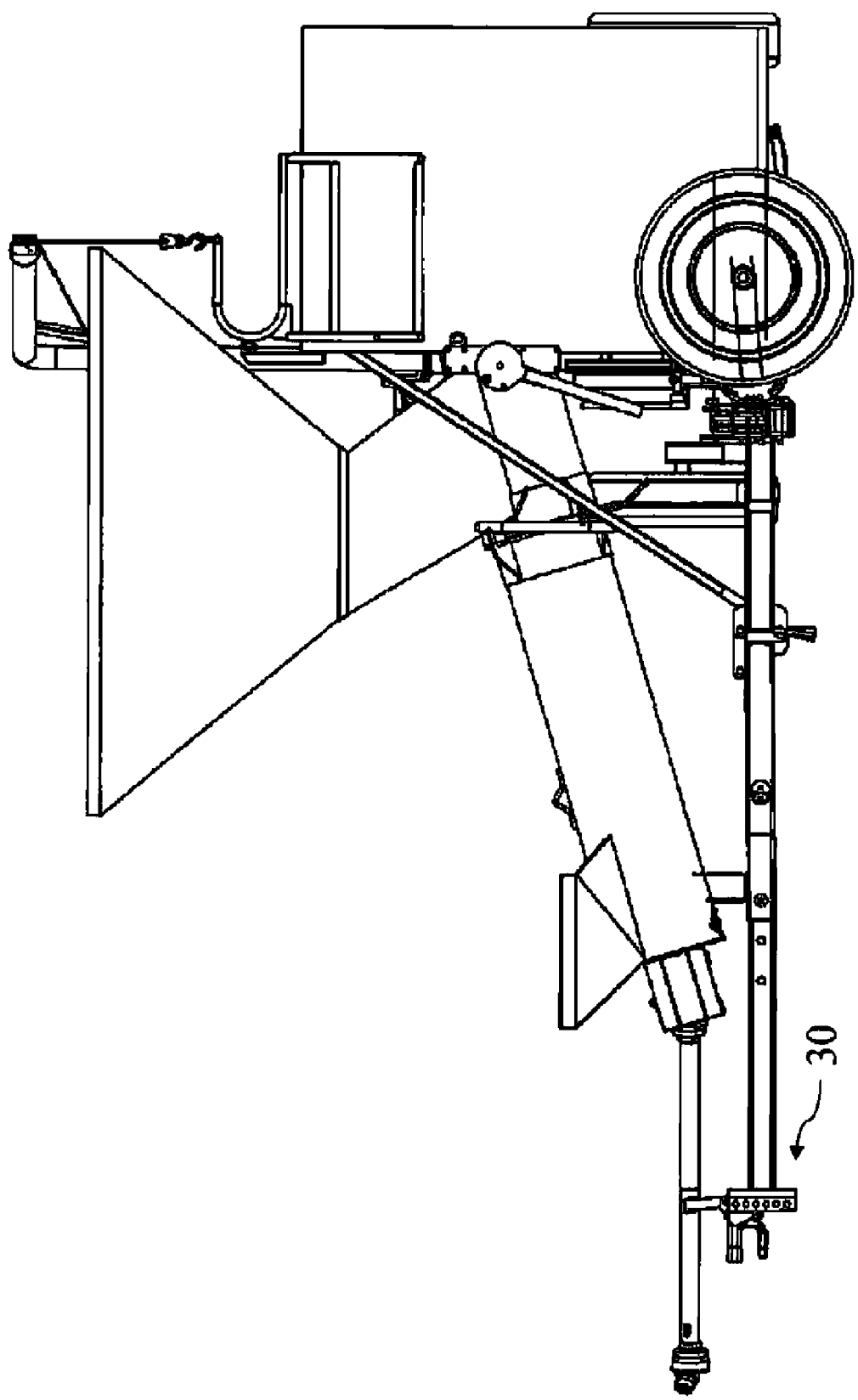
FIG. 3 is a side elevation view of the grain bagger in the off road mode.

Operation:

Referring to FIG. 1 through 3, grain bagger 10 is illustrated in the off road mode. In this mode, frame 12 is towed from first towing connection 30 during use in farm fields. When grain bagger must be transported down a highway to another farm field a conversion must take place from the illustrated off road mode to the highway mode. Referring to FIG. 5, auger 48 is swung from cradle 46 on hitch bar 36 of first hitch support 32 and pivoted 90 degrees to second hitch support 40, so that auger 48 is out of the way. Referring to FIG. 6, hitch bar 36 is removed from first receiver 34 of first hitch support 32. Referring to FIG. 7, first hitch support 32 is pivotally raised from the operative towing position to a raised inoperative position. Referring to FIGS. 8 and 9, hitch bar 36 is inserted into second receiver 42 on second hitch support 40 of second towing connection 38. Referring to FIG, 10, second towing connecting 38 is connected to the tow vehicle and then coordinated movement is initiated with hydraulic actuator 28 to alter the position of second set of wheels 20 and 22 while hydraulic actuator 44 alters the vertical positioning of hitch bar 36 relative to second receiver 42. Referring to FIGS. 11 and 12, hydraulic actuator 44 extends to accommodate a change in the vertical positioning of hitch bar 36 as frame 12 is raised. Referring to FIGS. 13 and 14, hydraulic actuator 28 rotates drop axle 26. The rotation of drop axle 26 causes second set of wheels 20 and 22 to move from the raised inoperative position illustrated in FIG. 13 to the lowered operative position illustrated in FIG. 14. Referring to FIG. 5, auger 48 is pin clamped to an auger rest 50. Referring to FIG. 15, PTOshaft is placed into cradle 46 on hitch bar 36 on second hitch support 40, during parking and storage. Referring to FIG. 15 through 17, grain bagger 10 is now in the highway mode for movement to the next farm field where it is required.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. A towed vehicle having two towing modes, comprising:
    a frame;
    a first set of wheels positioned on a first axis, the first set of wheels having an operative position supporting the frame;
    a second set of wheels positioned on a second axis, the second axis being perpendicular to the first axis, the second set of wheels having a lowered operative position and a raised inoperative position, when the second set of wheels is in the lowered operative position, they support the frame and lift the first set of wheels off the ground to an inoperative position;
    a first towing connection for connecting the frame to a tow vehicle when the first set of wheels are in the operative position and the second set of wheels are in the inoperative position;
    a second towing connection, perpendicular to the first towing connection, for connecting the frame to the tow vehicle when the second set of wheels are in the operative position and the first set of wheels are in the inoperative position; and
    the towed vehicle is agricultural machinery having an auger, the auger being pivoted from a first position overlying the first towing connection to a second position overlying the second towing connection.

2. The towed vehicle of claim 1, wherein the second set of wheels are mounted on a drop axle, and the second set of wheels are moved between the operative position and the inoperative position by using an actuator to rotate the drop axle.

3. The towed vehicle of claim 1, wherein the first towing connection includes a first hitch support which is movable between an operative towing position and an inoperative position.

4. The towed vehicle of claim 3, wherein the first hitch support has a receiver in which is removably received a hitch bar.

5. The towed vehicle of claim 1, wherein the second towing connection includes a second hitch support having a receiver in which is removably received a hitch bar, an actuator being provided to alter the vertical positioning of the hitch bar relative to the receiver.

6. The towed vehicle of claim 1, wherein the towed vehicle is agricultural machinery and the second set of wheels are maintained in the raised inoperative position during operation of the agricultural machinery.

7. A towed vehicle having two towing modes, comprising:
- a frame;
- a first set of wheels positioned on a first axis, the first set of wheels having an operative position supporting the frame;
- a second set of wheels positioned on a second axis, the second axis being perpendicular to the first axis, the second set of wheels having a lowered operative position and a raised inoperative position, when the second set of wheels is in the lowered operative position, they support the frame and lift the first set of wheels off the ground to an inoperative position, the second set of wheels being mounted on a drop axle and moved between the operative position and the inoperative position by using an actuator to rotate the drop axle;
- a first towing connection for connecting the frame to a tow vehicle when the first set of wheels are in the operative position and the second set of wheels are in the inoperative position, the first towing connection including a first hitch support which is movable between an operative towing position and an inoperative position, the first hitch support having a first receiver in which is removably received a hitch bar;
- a second towing connection, perpendicular to the first towing connection, for connecting the frame to the tow vehicle when the second set of wheels are in the operative position and the first set of wheels are in the inoperative position, the second towing connection including a second hitch support having a second receiver in which is removably received a hitch bar, an actuator being provided to alter the vertical positioning of the hitch bar relative to the second receiver;
- the towed vehicle is agricultural machinery having an auger, the auger is supported on an auger rest, the auger rests on the auger rest when the hitch bar forms part of the first towing connection, and the auger pivoting to rest on the auger rest when the hitch bar forms part of the second towing connection.

8. The towed vehicle of claim 7, wherein the agricultural machinery is a grain bagger.

\* \* \* \* \*